C. GUISE & T. J. SOUTHALL.
MUD GUARD FOR VEHICLE WHEELS.
APPLICATION FILED AUG. 25, 1917.
1,266,120.
Patented May 14, 1918.
2 SHEETS—SHEET 2.
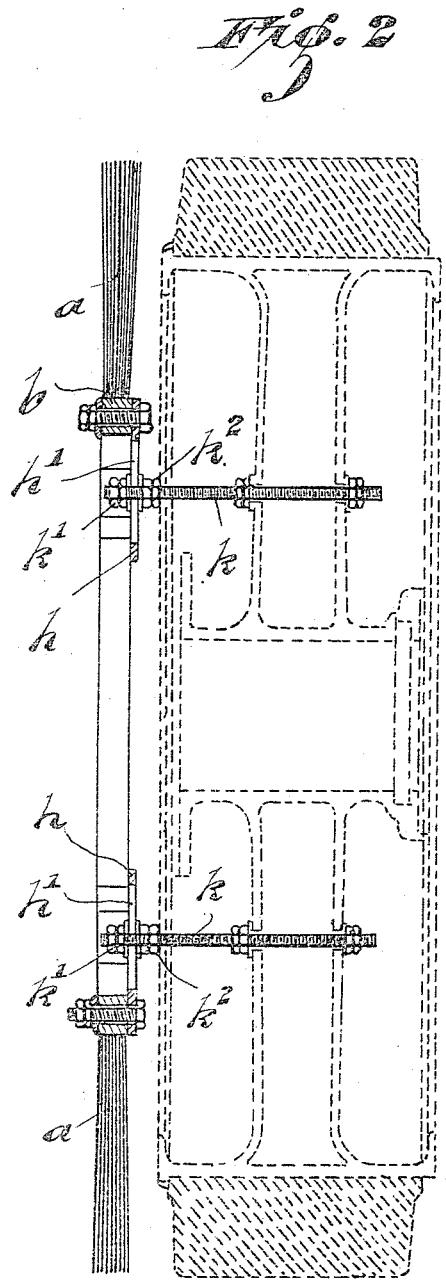
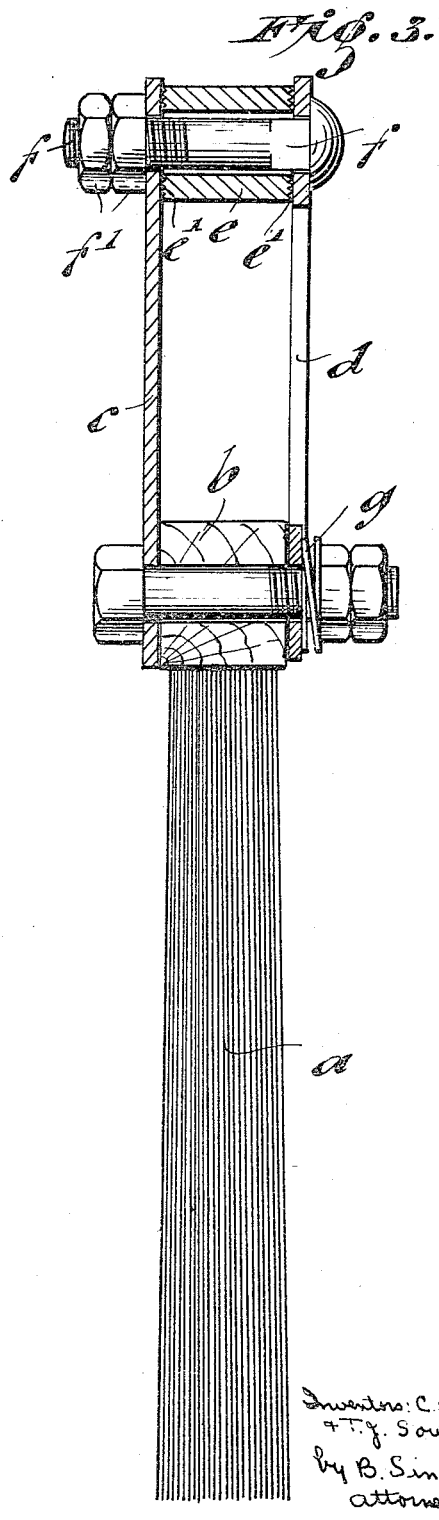

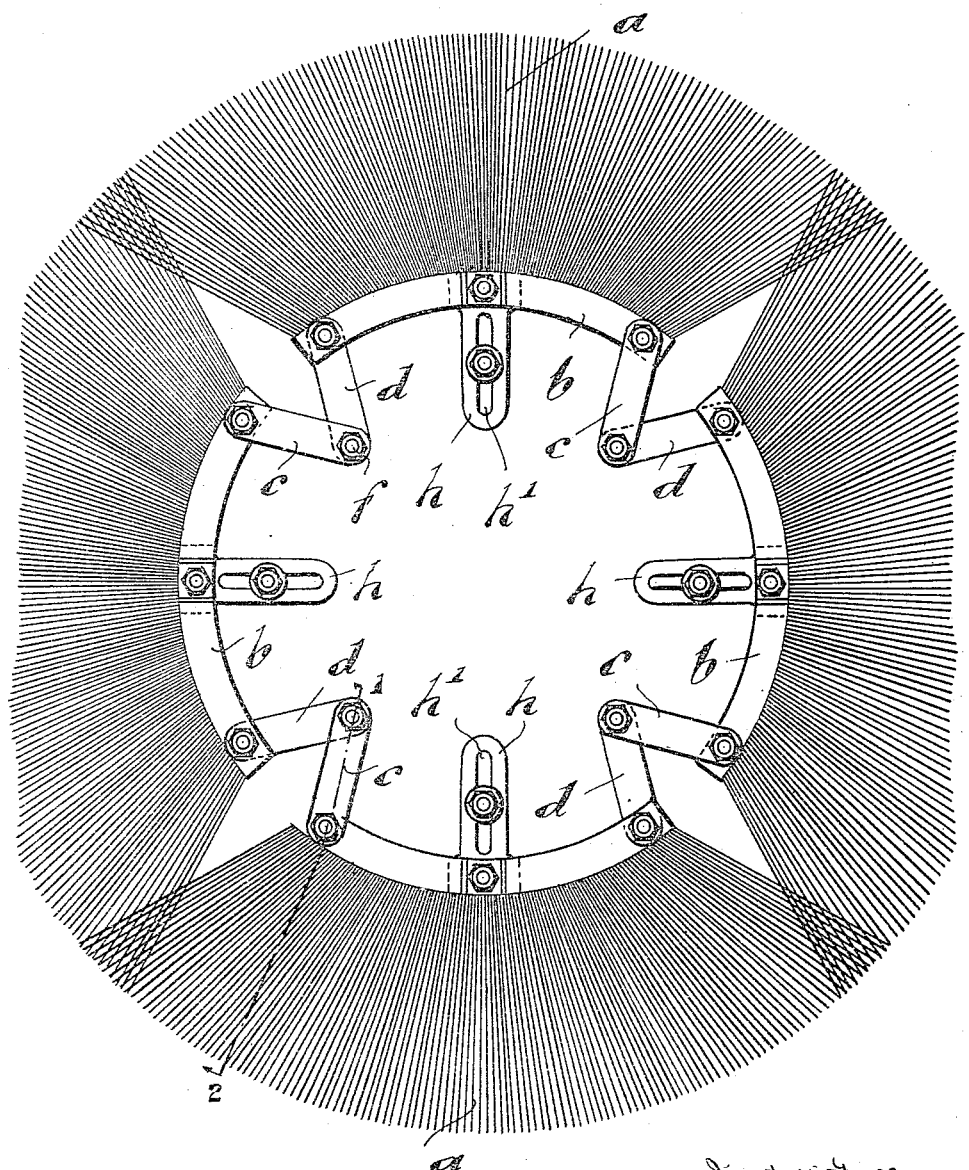

UNITED STATES PATENT OFFICE.

CHARLES GUISE, OF MALVERN, AND THOMAS JOSEPH SOUTHALL, OF WORCESTER, ENGLAND.

MUD-GUARD FOR VEHICLE-WHEELS.

1,266,120.

Specification of Letters Patent.

Patented May 14, 1918.

Application filed August 25, 1917. Serial No. 188,143.

*To all whom it may concern:*

Be it known that we, CHARLES GUISE, a subject of the Kingdom of Great Britain, residing at The Gables, Court Road, in the town of Malvern, in the county of Worcester, England, and THOMAS JOSEPH SOUTHALL, a subject of the Kingdom of Great Britain, residing at Arks, Selborne Road, in the city of Worcester, county of Worcester, England, have invented certain new and useful Mud-Guards for Vehicle-Wheels, of which the following is a specification.

This invention relates to mud or splash guards for vehicle wheels of the type in which the guard is of an annular formation arranged at the side of the wheel, and in connection with which it has been proposed to form the outer periphery of the guard of flexible material, such as sheet rubber, bristles, or the like, the present improvements consisting of a guard of this type which is adapted to be adjusted to increase or reduce its circumferential dimension, and which is also adapted in connection with one and the same wheel to be fixed in varying conditions of said adjustment, so as to enable the size of the diameter of the guard to be adjusted to suit the varying diameter of the tread of the tire, which variation is caused by wear or replacement. Advantageously the guard is formed in separate sections or segments, which are so connected together, as to allow of such sections or segments being adjusted to, and secured in positions nearer to, or farther from their common center as required.

In order that this invention may be clearly understood, and more readily carried into practice, reference may be had to the appended explanatory drawings, upon which:—

Figure 1 is a part front elevation of a guard, the diameter of which is adjustable.

Fig. 2 is a section through the guard illustrating one means of attachment to the wheel which is shown in dotted lines.

Fig. 3 is an enlarged sectional elevation through Fig. 1 on the lines 1—2.

In an embodiment of this invention the guard $a$ and its holder $b$ are made in sections or segments, which are connected together by links $c$ $d$, the ends of which are respectively pivotally connected to the sections or segments of the holder $b$, the other ends of the links $c$, and $d$, being pivotally connected together by bolts $f$ and tubular distance pieces $e$, in such a manner that sections or segments can be moved inward toward the center for the reduction of the diameter of the guard $a$, or outwardly from the center for increasing the diameter of the guard. The tubular distance pieces $e$ are provided with serrated ends $c^1$ having their bearing against the links $c$ and $d$, so that upon the tightening up of the nuts $f^1$ the sections or segments of the guard are locked in the position to which they have been adjusted, the bolt $f$, being provided with a square neck, so as to obviate the possibility of the bolt turning when the nuts $f^1$ are being tightened up. A spring washer $g$ is provided on each of the pins which secure the links $c$ and $d$ to the sections of the holder $b$, so that upon the loosening of the nuts $f^1$, for the purpose of adjustment in the diameter of the guard, the sections of the holder are retained in their respective positions pending the adjustment in diameter being effected.

In one method of securing the splash preventer to the wheel plates $h$ having slots $h^1$ are fixed upon the holder $b$, such slotted plates being adapted to slide in a radial direction upon screw rods, which in the case of metal wheels, are secured to the webs or flanges of the wheel, and which are provided with double sets of nuts and washers $k^1$ $k^2$, between which double sets of nuts the slotted plate $h$ can be clamped and locked when the outer diameter of the guard is adjutsed in relation to the diameter of the tire and wheel.

In case of wood wheels, the screw bolts $k$ may be secured by being passed through, and bolted to the spokes of the wheel.

Although the flexible guard is shown in the drawings as consisting of bristles which are free from liability to damage when meeting any obstacle on the road, or when being pressed sidewise against any obstacle such as the curbstone, it will be readily understood that any flexible material such as sheet rubber may be used.

The bristles or other flexible material $a$ are spread out, so that the flexible material of the end of one section to a certain extent overlaps the flexible material of the end of the other section, thus obviating substantial gaps between the sections of the guard when the diameter of the guard is increased.

What we claim as our invention, and desire to secure by Letters Patent is:—

1. Sectional annular mud or splash guards for vehicle wheels, comprising a plurality of segments constituting a holder, bristles secured in said segments, links pivotally connecting the single segments, means for pivotally connecting and means for spacing said links, permitting an adjustment toward and from the center of said guard, and means for securing said guards to a wheel.

2. Sectional annular mud or splash guards for vehicle wheels comprising a plurality of segments constituting a holder for an annulus of flexible material having its edges partly overlapping at the periphery, links pivotally connecting the single segments, bolts for pivotally connecting, and tubular elements for distancing or spacing said links and permitting an adjustment of the segments toward and from the center of said guard, nuts on said bolts, and spring washers for retaining the segments in their relative positions pending the adjustment of said links, and means for securing the guard to a wheel.

3. Sectional annular mud or splash guards for vehicle wheels comprising a plurality of segments constituting a holder for an annulus of flexible material having its edges partly overlapping at the periphery, links pivotally connecting the single segments, bolts for pivotally connecting, and tubular elements for distancing or spacing said links and permitting an adjustment of the segments toward and from the center of said guard, nuts on said bolts, and spring washers for retaining the segments in their relative positions pending the adjustment of said links, slotted plates secured to said segments, threaded rods upon which plates are adapted to slide in radial direction, said rods being secured to the wheel flanges, and double sets of nuts and washers between which said plates are clamped for securing said guards to a wheel.

In witness whereof we have hereunto set our hands in the presence of two witnesses.

CHARLES GUISE.
THOMAS JOSEPH SOUTHALL.

Witnesses:
ARTHUR H. BROWN,
A. J. DAVIES.

Copies of this patent may be obtained for five cents each, by addressing the "Commissioner of Patents, Washington, D. C."